(12) United States Patent
Staschik

(10) Patent No.: US 8,083,934 B2
(45) Date of Patent: Dec. 27, 2011

(54) WATER DISINFECTION APPARATUS

(76) Inventor: Udo Staschik, Winnipeg (CA)

( * ) Notice: Subject to any disclaimer, the term of this patent is extended or adjusted under 35 U.S.C. 154(b) by 495 days.

(21) Appl. No.: 12/329,332

(22) Filed: Dec. 5, 2008

(65) Prior Publication Data

US 2010/0122946 A1     May 20, 2010

(30) Foreign Application Priority Data

Nov. 20, 2008 (CA) .................................. 2644329

(51) Int. Cl.
*B01D 17/12* (2006.01)
(52) U.S. Cl. ............ 210/85; 210/90; 210/109; 210/138; 210/192; 222/52; 222/638; 250/435; 422/186.3
(58) Field of Classification Search .............. 210/85–94, 210/109, 110, 134, 138, 139, 143, 192, 739, 210/748.1, 748.11; 422/24, 186.3; 250/435, 250/436; 222/52, 638
See application file for complete search history.

(56) References Cited

U.S. PATENT DOCUMENTS

| | | | | |
|---|---|---|---|---|
| 4,471,225 A | * | 9/1984 | Hillman | 250/436 |
| 4,801,375 A | * | 1/1989 | Padilla | 210/100 |
| 4,849,100 A | * | 7/1989 | Papandrea | 210/138 |
| 4,969,991 A | * | 11/1990 | Valadez | 210/96.2 |
| 5,683,576 A | * | 11/1997 | Olsen | 210/138 |
| 5,837,147 A | * | 11/1998 | Joung | 210/739 |
| 6,461,520 B1 | | 10/2002 | Engelhard et al. | |
| 6,468,420 B1 | * | 10/2002 | Kunkel | 210/90 |
| 7,641,790 B2 | * | 1/2010 | Maiden | 210/91 |

FOREIGN PATENT DOCUMENTS

| | | |
|---|---|---|
| CA | 2442903 A1 | 3/2004 |
| DE | 3924350 * | 1/1991 |

OTHER PUBLICATIONS

Derwent translated Abstract for Publication DE 3924350, published Jan. 1991.*

* cited by examiner

*Primary Examiner* — Joseph Drodge
(74) *Attorney, Agent, or Firm* — Standley Law Group LLP

(57) ABSTRACT

A water disinfection apparatus includes a chamber adapted for connection to a pressurized water source. An ultra violet light is oriented to shine ultra violet rays into the chamber and to disinfect water therein, and a normally closed output valve connects the chamber to a supply valve. A control senses when a connected supply valve has been opened, and is operative to turn the ultra violet light on when the connected supply valve is opened; open the output valve after the ultra violet light has been turned on; close the output valve off after a supply time period expires; and turn the ultra violet light off when the output valve has been closed. The ultra violet light is turned on at all times that the output valve is open.

10 Claims, 1 Drawing Sheet

WATER DISINFECTION APPARATUS

CROSS-REFERENCE TO RELATED APPLICATIONS

As authorized by 35 U.S.C. §119, this application claims priority to and hereby incorporates by reference Canadian Application Serial No. 2,644,329, titled WATER DISINFECTION APPARATUS, filed on Nov. 20, 2008.

TECHNICAL FIELD

This invention is in the field of potable water systems and in particular a water disinfection apparatus for reducing power consumption, and also providing an indication to a user that the system is operating.

BACKGROUND

Water disinfection systems use a variety of means for killing bacteria in a water supply, such as chlorine injection, reverse osmosis, ozone injection, ultra-violet light (UV), and so forth.

UV disinfection is considered a safe and reliable method to improve the quality of potable water. The UV disinfection system operates by using a power source to generate a light of a specific frequency in a chamber through which the water passes. The light inactivates contaminates in the water to render same suitable for human consumption. In conventional UV systems this light is constantly "ON" to provide a safe operational mode for the system.

Such a UV light water disinfection is shown in Canadian Patent Number 2442903 to Schaible et al.

SUMMARY OF THE INVENTION

It is an object of the present invention to provide a water disinfection system that overcomes problems in the prior art.

In situations where power to the UV disinfection system is provided by a central power source, the fact that the power is constantly "on" regardless of whether it is needed to disinfect water flowing through the system is of little concern, except that power is being wasted. In other situations however where only a limited amount of power is available, such as renewable energy systems, the aspect of power consumption becomes an issue of considerable concern.

The present invention provides a system whereby the UV disinfection system operates safely to destroy harmful water contaminants and at the same time significantly reduces power consumption. The invention also provides for a user friendly feed back mechanism allowing the user of the potable water to immediately determine if the UV disinfection system is operating properly.

In a first embodiment the present invention provides a water disinfection apparatus comprising a chamber adapted for connection to a pressurized water source. An ultra violet light is oriented to shine ultra violet rays into the chamber and is operative to disinfect water in the chamber, and a normally closed output valve is adapted to connect the chamber to at least one supply valve through a supply conduit. A control is operative to sense when a connected supply valve has been opened, and is operative to turn the ultra violet light on when the connected supply valve is opened; open the output valve after the ultra violet light has been turned on; close the output valve off after a supply time period expires; and turn the ultra violet light off when the output valve has been closed. The ultra violet light is turned on at all times that the output valve is open.

In a second embodiment the present invention provides a water system comprising a chamber connected to a pressurized water source. An ultra violet light is oriented to shine ultra violet rays into the chamber and operative to disinfect water in the chamber, and a normally closed output valve connects the chamber to at least one supply valve through a supply conduit. A control is operative to sense when the at least one supply valve is opened, and is operative to turn the ultra violet light on when the supply valve is opened; open the output valve after the ultra violet light has been turned on; close the output valve off after a supply time period expires; and turn the ultra violet light off after the output valve has been closed. The ultra violet light is turned on at all times that the output valve is open.

The invention provides a water disinfection system that reduces power requirements, increasing efficiency in all applications, and is particularly suited to applications where power supply is limited. An indication of proper operation can be provided by a delay between the time a supply valve, such as a water tap, is opened, and the time full water flow is seen at the opened tap.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
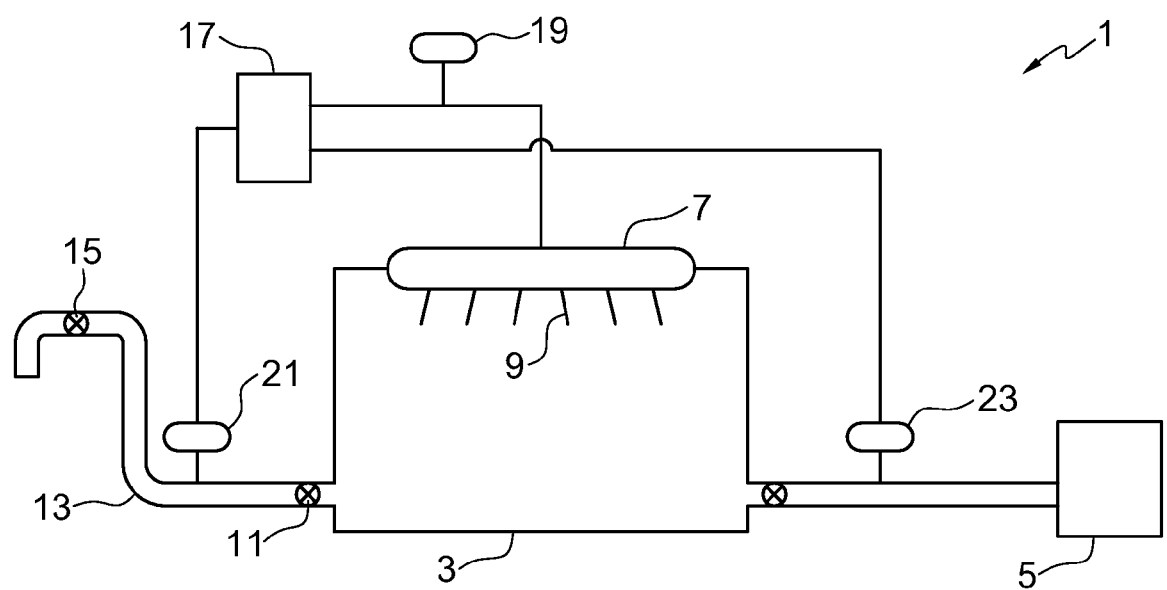
FIG. 1 is a side schematic view of a water disinfection apparatus of the present invention.

FIG. 1 schematically illustrates an embodiment of a water disinfection apparatus 1 of the present invention. The apparatus 1 comprises a chamber 3 adapted for connection to a pressurized water source 5. The source 5 can be a municipal water supply, or a pump drawing water from a lake or well, or any similar source where the user requires potable water and is not confident that the source 5 provides such potable water.

An ultra violet (UV) light 7 is oriented to shine UV rays 9 into the chamber 3 and is operative to disinfect water in the chamber 3. A normally closed output valve 11 is adapted to connect the chamber 3 to a supply conduit 13 that carries water to one or more supply valves 15 such as the taps, washing machines, toilets, and the like that are typically found in a residential or commercial water system to control water flow.

A control 17 is operative to sense when a connected supply valve 15 has been opened, and then is operative to turn the UV light 7 on when the connected supply valve 15 is opened, open the output valve 11 after the UV light 7 has been turned on, close the output valve 11 off after a specified supply time period expires, and turn the UV light 7 off after the output valve 11 has been closed. The control 17 is configured such that the UV light 7 is turned on at all times that the output valve 11 is open.

In order to ensure proper operation of the disinfection apparatus 1, and thereby ensure that the water is safe for use, the control 17 is operative to sense an amount of power drawn by the UV light 7 and compare the amount of power drawn with a specified power range that indicates the UV light 7 is operating properly. A current meter 19 is connected to the UV light 7 and the control 17 to measure current through the UV light and thus the amount of power being drawn.

The control 17 is configured to open the output valve 11 only when the amount of power drawn by the UV light 7 is in the specified power range. To further ensure safety of the water, the control 17 is also configured to open the output valve 11 only after the amount of power drawn by the UV light 7 has been in the specified power range for a specified powered time period, and to close the output valve 11 when the amount of power drawn moves out of the specified power range. Thus the output valve 11 is only open, and water is only being provided to the supply valve 15, when the UV light 7 is drawing power in an amount that is in the specified power range, thereby indicating proper operation.

The apparatus 1 is configured such that a full supply flow of water at the supply valve 15 is delayed after the supply valve 15 is opened. This delay can include the powered time period referred to above after the UV light is turned on, and also a delay caused by the means for sensing that the supply valve has been opened. For example the control 17 can be operative to sense when the supply valve 15 is opened by sensing a pressure of water in the supply conduit 13. A pressure switch 21 is connected to the supply conduit 13 and the control 17. When the supply valve 15 is opened, the pressure in the supply conduit 13 will drop below a selected pressure, typically for example 40 pounds per square inch (psi), and then this pressure drop will indicate to the control 17 that the supply valve 15 has been opened, and the control will initiate the above described operation of the UV light 7 and outlet valve 11. There will be delay even without the powered time period since the supply valve 15 must be opened to release some water to drop the pressure before the control 17 can turn on the output valve 11 and water pressure builds up again.

The delay of full flow of water at the opened supply valve acts as an indicator of proper operation of the disinfection apparatus. For example when a user opens a tap at a sink after a period of non-use, the water will at first come out under substantially full pressure, provided no leaks are present, such water flows full and then drops quickly off to a trickle, and then resumes full flow after a delay period of a few seconds. This delay is part of the normal operation, and if a tap opens without the delay it is an indicator that something is wrong, for example the output valve may be stuck open, and service is required to avoid the risk of unsafe water being dispensed at the supply valve 15.

The control 17 is configured to close the output valve 11 off after a supply time period expires. The supply time period can be selected to maintain the output valve 11 in an open position for a time period substantially corresponding to a length of time required to perform a selected or contemplated operation such as dishwashing, or bathroom use where the operation typically requires that a supply valve such as a tap be opened and closed a plurality of times. In a typical residential application, supply valves 15 will be closed for extended periods of time, and then opened and closed a number of times in a relatively short period of time such as when washing dishes or using the bathroom.

Once the supply valve 15 is opened after a period of being closed, the control 17 turns on and checks the UV light and then opens the output valve 11 to allow water to flow to the supply valve 15. If all supply valves 15 are closed for a short time, the output valve 11 is left open to allow water to continue to flow to any supply valves 15 that might be opened during the supply time period.

Should the supply time period expire and the output valve 11 close when the supply valve 9 is open, the pressure switch 19 will sense that pressure in the supply conduit 13 is low and start the process of turning on the UV light 7 and opening the output valve 11. Typically an adjustment will be provided so that the user can adjust the supply time period to suit their particular situation.

Alternatively the control 17 can be configured so that the supply time period is restarted each time a supply valve 9 is opened during a currently running supply time period. Thus repeatedly opening and closing any supply valve 9 at intervals less than the supply time period, or leaving a supply valve 15 open constantly, will cause the control 17 to keep the ultra violet light 7 turned on and the output valve 11 open for an extended time period until all supply valves 9 remain closed for a period of time longer than the supply time period such that the supply time period expires.

The control 17 could also be operative to sense when all connected supply valves 15 have been closed, and configured such that the supply time period only begins after all connected supply valves 15 have been closed, and such that the supply time period is restarted each time a connected supply valve 15 is opened. The pressure switch 21 will sense an increased pressure when all supply valves have been closed that can be used to start the supply time period running.

The control 17 in the illustrated apparatus 1 is also operative to sense an input pressure of the pressurized water source 5. An input pressure switch 23 senses the pressure in source 5 the control 17 is configured to turn the UV light 7 on only when the input pressure of the pressurized water source 5 is above a minimum pressure, for example 5-10 psi. The control 17 is thus configured to disable the apparatus 1 in the event the source pumps are run dry or the pumps have been deactivated for some other reason (burnt out, leak in supply line, no water, etc.). This will prevent unnecessary electrical consumption and extend the UV lamp life.

The present invention thus provides a water disinfection apparatus with reduced power requirements, and which also can provide an indication that the system is working properly.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A water disinfection apparatus comprising:
   a chamber adapted for connection to a pressurized water source;
   an ultra violet light oriented to shine ultra violet rays into the chamber and operative to disinfect water in the chamber;
   a normally closed output valve adapted to connect the chamber to at least one connected supply valve through a supply conduit; and
   a control operative to sense when the connected supply valve has been opened, and operative to:
   turn the ultra violet light on when the connected supply valve is opened;
   open the output valve after the ultra violet light has been turned on;
   close the output valve off after a supply time period expires; and
   turn the ultra violet light off when the output valve has been closed;

such that the ultra violet light is turned on at all times that the output valve is open.

2. The apparatus of claim 1 wherein the control is operative to sense an amount of power drawn by the ultra violet light and compare the amount of power drawn with a specified power range, and wherein the control is configured to open the output valve only when the amount of power drawn is in the specified power range.

3. The apparatus of claim 2 wherein the control is configured to open the output valve only after the amount of power drawn has been in the specified power range for a specified powered time period.

4. The apparatus of claim 2 wherein the control is operative to close the output valve when the amount of power drawn moves out of the specified power range.

5. The apparatus of claim 1 wherein the apparatus is configured such that a full supply flow of water at the connected supply valve is delayed after the connected supply valve is opened.

6. The apparatus of claim 5 wherein the control is operative to sense when the connected supply valve is opened by sensing a pressure of water in the supply conduit.

7. The apparatus of claim 1 wherein the control is operative to sense an input pressure of the pressurized water source and wherein the control is configured to turn the ultra violet light on only when the input pressure of the pressurized water source is above a minimum pressure.

8. The apparatus of claim 1 wherein the specified supply time period is selected to maintain the output valve in an open position for a time period substantially corresponding to a length of time required to perform a selected operation where the selected operation requires that the connected supply valve be opened and closed a plurality of times.

9. The apparatus of claim 1 wherein the normally closed output valve connects the chamber to a plurality of connected supply valves through the supply conduit, and wherein the supply time period is restarted each time one of the plurality of connected supply valves is opened during a currently running supply time period, such that repeatedly opening and closing one of the plurality of connected supply valves at intervals less than the supply time period will cause the control to keep the ultra violet light turned on and the output valve open for an extended time period until all connected supply valves remain closed for a period of time longer than the supply time period such that the supply time period expires.

10. The apparatus of claim 9 wherein the control is operative to sense when all connected supply valves have been closed, and wherein the supply time period begins after all connected supply valves have been closed, and wherein the supply time period is restarted each time one of the plurality of connected supply valves is opened.

* * * * *